United States Patent
Yu et al.

(10) Patent No.: US 9,732,718 B2
(45) Date of Patent: Aug. 15, 2017

(54) METHOD FOR CONTROLLING DIESEL ENGINE RAIL PRESSURE AT THE TIME OF ISG RESTARTING AND DIESEL ISG VEHICLE

(71) Applicant: HYUNDAI MOTOR COMPANY, Seoul (KR)

(72) Inventors: Seung-Eun Yu, Seoul (KR); Young-Ho Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 127 days.

(21) Appl. No.: 14/956,546

(22) Filed: Dec. 2, 2015

(65) Prior Publication Data

US 2017/0030317 A1     Feb. 2, 2017

(30) Foreign Application Priority Data

Jul. 27, 2015  (KR) .................. 10-2015-0106079

(51) Int. Cl.
*F02M 59/44*     (2006.01)
*F02M 63/02*     (2006.01)
(Continued)

(52) U.S. Cl.
CPC ........ *F02N 11/0829* (2013.01); *F02D 41/064* (2013.01); *F02D 41/3845* (2013.01); *F02D 41/3854* (2013.01); *F02D 41/3863* (2013.01); *F02M 59/447* (2013.01); *F02M 63/025* (2013.01); *F02M 63/0245* (2013.01); *F02N 11/0814* (2013.01); *F02D 41/042* (2013.01);
(Continued)

(58) Field of Classification Search
CPC ............ F02D 41/3845; F02D 41/3863; F02M 59/447; F02M 63/023; F02M 63/0245; F02M 63/025; F02N 11/0814; F02N 11/0829; F02N 11/0833; F02N 11/0837; F02N 11/0844; F02N 2019/002; F02N 2200/023

USPC ......... 701/113; 123/179.4, 179.17, 457, 458, 123/510–512

See application file for complete search history.

(56) References Cited

U.S. PATENT DOCUMENTS

| 2009/0271096 A1* | 10/2009 | Matsubara ............ F01N 3/0807 701/113 |
| 2013/0206111 A1* | 8/2013 | Riepl .................. F02D 41/3845 123/478 |

FOREIGN PATENT DOCUMENTS

| JP | 2004-324440 | 11/2004 |
| JP | 2011-132923 A | 7/2011 |

(Continued)

*Primary Examiner* — Erick Solis
(74) *Attorney, Agent, or Firm* — Brinks Gilson & Lione (57) ABSTRACT

Disclosed herein is a diesel ISG vehicle, including an engine ECU controlling a rail pressure of a common rail engine system, in which the engine ECU determines a cold start of the engine based on detected cooling water temperature and detected fuel temperature at the time of engine restarting by idle go of the idle stop & go (ISG) and then restarts the engine by a quick rail pressure control mode in which the pressure of the fuel pumped to a common rail is controlled or restarts the engine by a normal rail pressure control mode in which the flow rate and the pressure of the fuel is controlled, thereby improving the fuel efficiency by the ISG restarting which does not increase a driving torque of a high pressure pump, particularly, reducing a fuel injection quantity by reduction in a loss of accessories such as pump and compressor.

11 Claims, 7 Drawing Sheets

(51) Int. Cl.
  *F02N 11/08*  (2006.01)
  *F02D 41/38*  (2006.01)
  *F02D 41/06*  (2006.01)
  F02N 19/00  (2010.01)
  F02D 41/04  (2006.01)
  F02D 41/08  (2006.01)

(52) U.S. Cl.
  CPC ........ *F02D 41/08* (2013.01); *F02D 2200/021* (2013.01); *F02N 2019/002* (2013.01); *F02N 2200/023* (2013.01)

(56) References Cited

FOREIGN PATENT DOCUMENTS

| | | |
|---|---|---|
| JP | 2011-190775 | 9/2011 |
| KR | 10-2004-0012831 A | 2/2004 |
| KR | 10-2010-0051123 | 5/2010 |

* cited by examiner

METHOD FOR CONTROLLING DIESEL ENGINE RAIL PRESSURE AT THE TIME OF ISG RESTARTING AND DIESEL ISG VEHICLE

CROSS-REFERENCE TO RELATED APPLICATIONS

This application claims the benefit of and priority to Korean Patent Application No. 10-2015-0106079, filed Jul. 27, 2015, which is incorporated herein by reference in its entirety.

FIELD

The present disclosure relates to a diesel ISG (Idle Stop and Go) vehicle, and more particularly, to a method for controlling a diesel engine rail pressure.

BACKGROUND

The statements in this section merely provide background information related to the present disclosure and may not constitute prior art.

Generally, ISG (Idle Stop and Go) is an engine idle stop control which means idle stop and go and contributes to improvement in fuel efficiency of a vehicle by determining whether an engine is idle using information of a vehicle speed, an engine revolution per minute (RPM), cooling water temperature, etc., and then repeatedly stopping and restarting the engine. Accordingly, ISG technology has been applied to gasoline or diesel vehicles as well as hybrid vehicles to improve fuel efficiency.

Among the vehicles in which the ISG is equipped as described above, a diesel ISG vehicle links a rail pressure control mode of a common rail with ISG logic to perform a rail pressure control in an order of an outlet control (hereinafter, PCV control)→inlet/outlet control (hereinafter, CPC control)→inlet control (hereinafter, MeUn control) at the time of engine restarting by the idle go.

Here, the common rail means a component of a fuel injection apparatus in which high pressure fuel pumped by a high pressure pump stays before being injected into a combustion chamber to meet operation conditions. The PCV means a pressure control valve included in the common rail to control a fuel flow rate and the PCV control is a control mode to which only a rail pressure control is applied and operates the high pressure pump which increases a pressure of fuel delivered from a low pressure pump pumping fuel within a fuel tank to pump the fuel to the common rail. The MeUn means a metering unit valve included in the fuel pump to open and close a flow of fuel and the MeUn control is a control mode to which only a fuel pressure control is applied. The CPC means a coupled pressure control and the CPC control is a control mode to which both of a rail pressure control and a fuel pressure control are applied and operates the high pressure pump which increases a pressure of the fuel delivered from the low pressure pump pumping the fuel within the fuel tank to pump the fuel to the common rail.

However, among the rail pressure control modes performed at the time of the engine restarting by the ISG, the PCV control and the CPC control is advantageous only at the time of initial cold start required to increase a temperature of fuel and form the rail pressure, but increases a driving torque of the high pressure pump which leads to a loss of accessories such as a pump and a compressor. Therefore, the operation based on the PCV/CPC control mode at the time of frequently restarting the engine by the ISG increases the driving torque of the high pressure pump, which negatively impacts fuel efficiency.

SUMMARY

One form of the present disclosure is directed to a method for controlling a diesel engine rail pressure at the time of ISG restarting and a diesel ISG vehicle capable of improving fuel efficiency even when the ISG restarting is frequently performed by allowing a rail pressure control mode executed at the time of the ISG restarting to increase a driving torque of a high pressure pump only in cold start conditions of an engine, in particular, reducing a fuel injection quantity by reducing a loss of accessories such as a pump and a compressor.

In accordance with one form of the present disclosure, a method of controlling a diesel engine rail pressure at the time of ISG restarting includes: (A) an idle stop & go (ISG) operation confirming step of confirming, by a controller, whether a restarting signal is an idle go or an ignition switch (IG) on when recognizing a stop of an engine by an idle stop of ISG and then detecting a restarting signal of the engine; (B) a rail pressure control selecting step of determining, by the controller, an excess of a cold starting condition of the engine based on engine monitoring data of the engine if it is confirmed that the restarting signal is the idle go; and (C) a quick rail pressure control step of selecting, by the controller, an MeUn control at the time of the excess of the idle go condition and the cold starting condition and performing, by an MeUn control, the restarting based on a pressure control of fuel pumped to a common rail.

The engine monitoring data may include detected cooling water temperature and detected fuel temperature, the detected cooling water temperature and the detected fuel temperature may each be defined as current cooling water temperature and current fuel temperature when the cold starting condition is determined, and the current cooling water temperature and the current fuel temperature may each be compared with set cooling water temperature and set fuel temperature to determine the excess of the cold starting condition. The excess of the cold starting condition may be when the current cooling water temperature is larger than the set cooling water temperature and the current fuel temperature is lager than the set fuel temperature. The MeUn control may be performed by a control of a metering unit valve included in a fuel pump.

The method may further include: (D) a normal rail pressure control step of selecting, by the controller, all of the a PCV control, a CPC control, and the MeUn control when the IG on or the cold start condition arrives, wherein the PCV control performs the restarting based on a control of a flow rate of fuel pumped to the common rail, the CPC control performs the restarting based on a flow rate and a pressure control of fuel pumped to the common rail 30, and the MeUn control performs the restarting based the pressure control of the fuel pumped to the common rail. The controller may perform the MeUn control after the PCV control and the CPC control may be performed at a predetermined frequency for a predetermined time. The predetermined time may be from 10 to 15 seconds. The PCV control may be implemented as a pressure control value included in the common rail.

In accordance with another form of the present disclosure, a diesel ISG vehicle includes: an engine electronic control unit (ECU) configured to compare cooling water temperature and fuel temperature with set values to determine a cold start of an engine, recognize idle stop and idle go signals of idle stop & go (ISG), detect an ignition switch (IG) on/off, perform the engine restarting based on a pressure control of fuel pumped to a common rail at the time of the idle go and an excess of the cold start condition, and perform the engine restarting based on a flow rate control and a pressure control of fuel pumped to the common rail at the time of an arrival of IG on or the cold start condition; and a common rail engine system configured to include a plurality of injectors included in a common rail to inject fuel, a metering unit valve included in a fuel pump to perform a pressure control of the fuel by a control of the engine ECU, and a pressure control valve included in the common rail to perform a flow rate control of the fuel by the control of the engine ECU.

The engine ECU may include a cold start determiner and the cold start determiner compares cooling water temperature and fuel temperature with set values to determine cold start of the engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
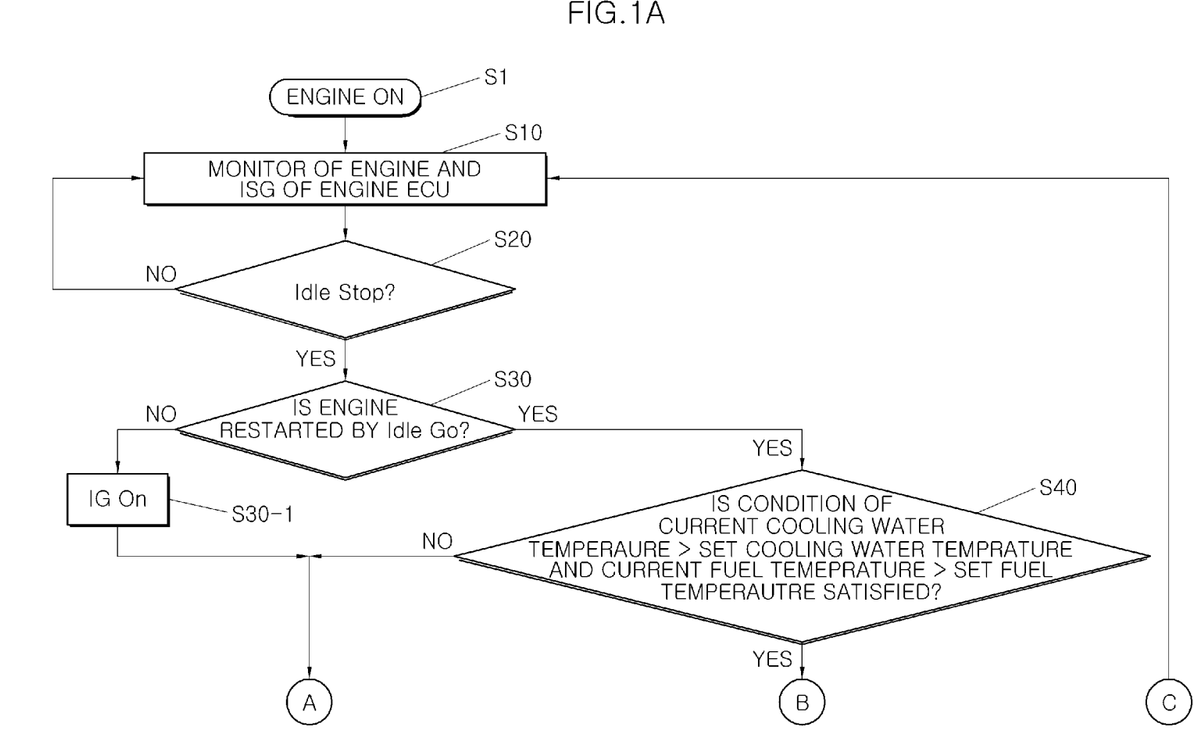
FIGS. 1A and 1B are flow charts of a method for controlling a diesel engine rail pressure at the time of ISG restarting according to an exemplary form of the present disclosure.
Figure 1B:
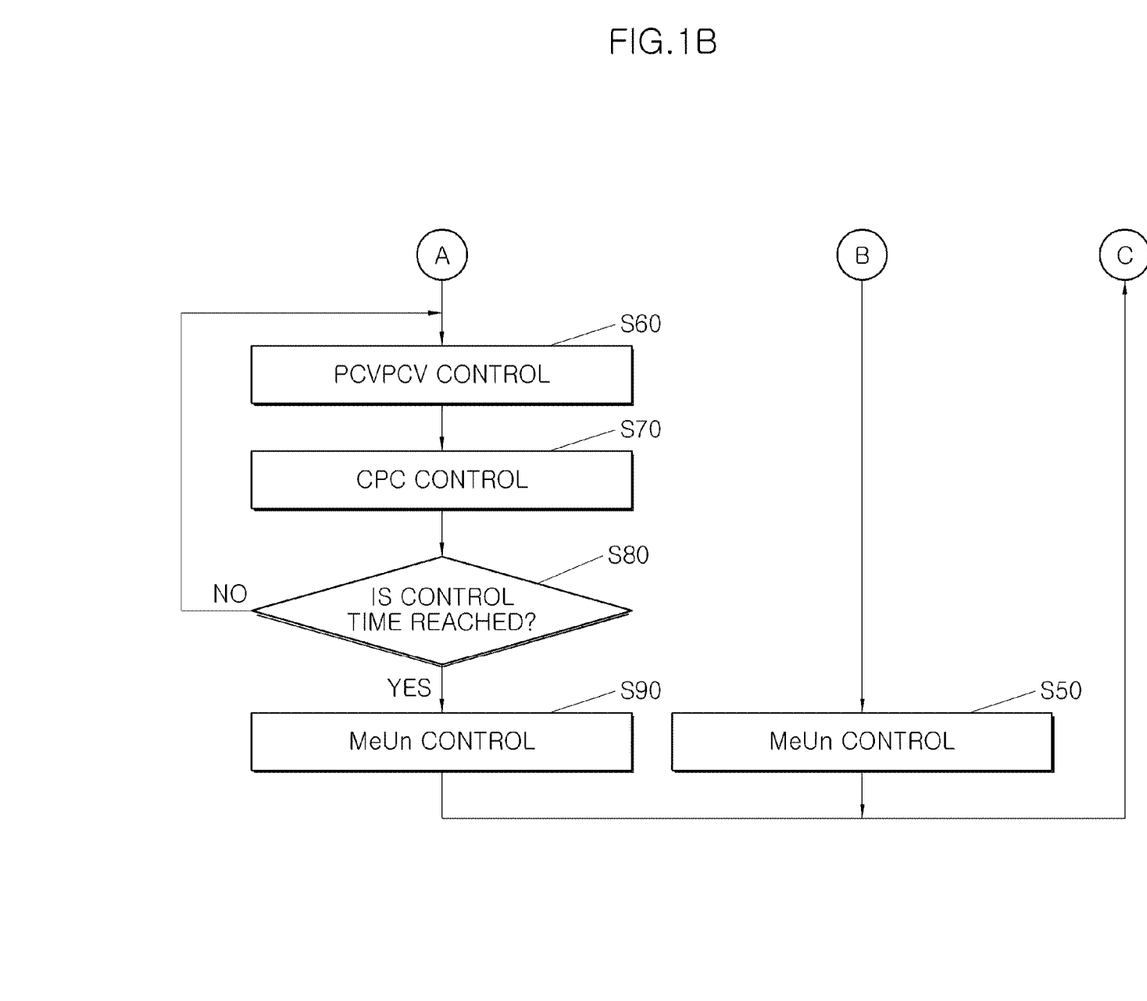

FIGS. 1A and 1B are flow charts illustrating a method for controlling a diesel engine rail pressure at the time of ISG restarting according to an exemplary form of the present disclosure.

As illustrated in FIGS. 1A and 1B, a method for controlling a diesel engine rail pressure at the time of ISG restarting clearly performs a rail pressure control mode of confirming whether engine restarting is idle go continued to idle stop of ISG when a controller for an engine control recognizes engine restarting after the idle stop of the ISG and inhibiting a driving torque of a high pressure pump from increasing at the time of the engine restarting depending the idle go. Therefore, the method for controlling a diesel engine rail pressure at the time of the ISG restarting is divided into a normal rail pressure control mode and a quick rail pressure control mode by a controller.

Figure 2:
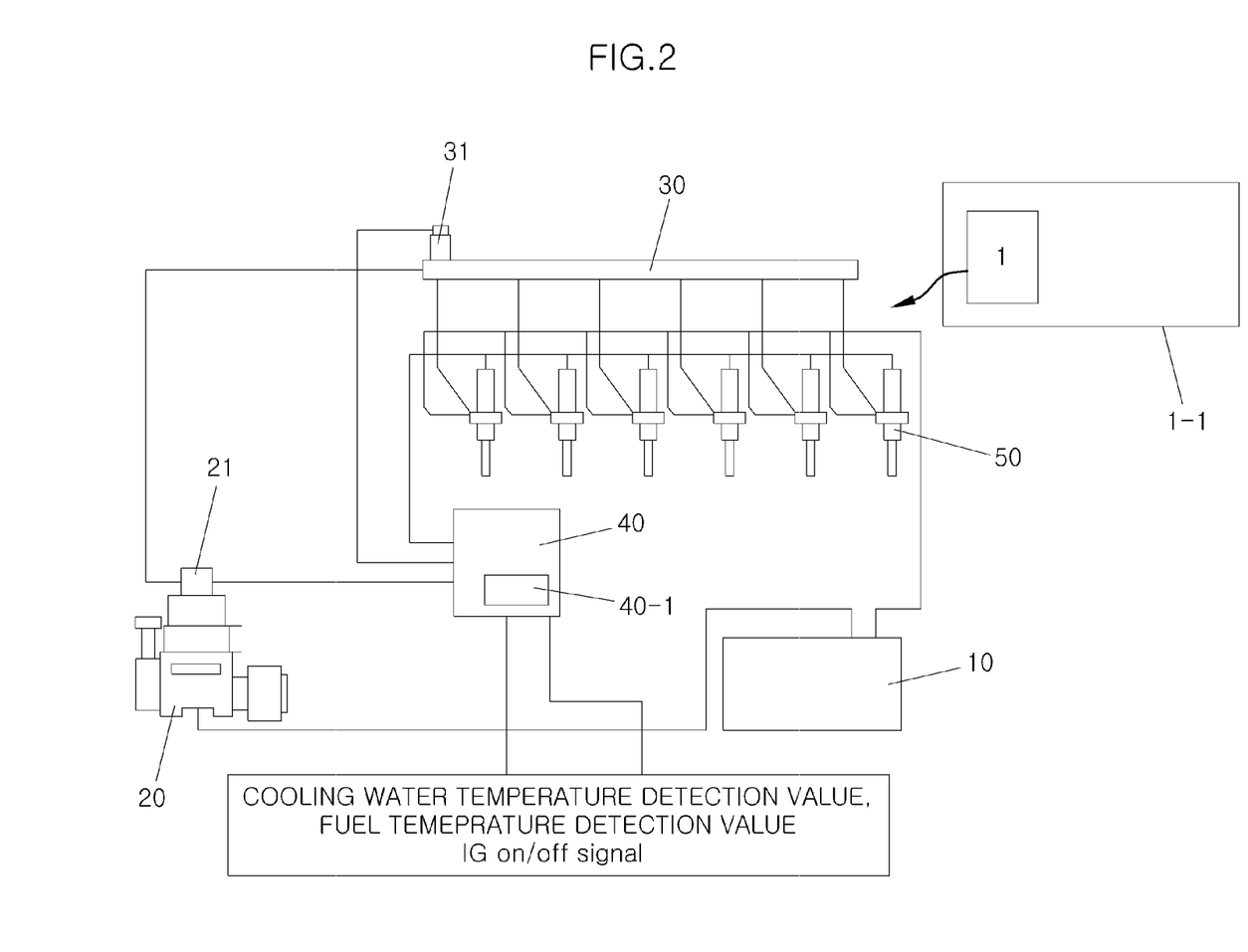
FIG. 2 is a diagram illustrating an example of a diesel ISG vehicle to which a controller performing a diesel engine rail pressure control at the time of ISG restarting according to an exemplary form of the present disclosure is applied.

Meanwhile, FIG. 2 illustrates a diesel ISG vehicle in which the diesel engine rail pressure control is divided into the normal rail pressure control mode and the quick rail pressure control mode by the controller at the time of the ISG restarting.

As illustrated in FIG. 2, a diesel ISG vehicle 1-1 includes a common rail engine system 1. The common rail engine system 1 includes a metering unit valve (hereinafter, MeUn) 21 included in a fuel pump 20 which pumps fuel of a fuel tank 10, a pressure control valve (hereinafter, PCV) 31 included in a common rail 30 having an injector 50 for fuel injection, a controller 40 controlling the MeUn 21 and the PCV 31 at the time of performing the rail pressure control mode, and a cold start determiner 40-1 equipped in the controller 40. In particular, the cold start determiner 40-1 uses detected cooling water temperature, detected fuel temperature, and recognized ignition switch (IG) on/off for the controller 40 to perform the rail pressure control mode by being divided into the normal rail pressure control mode and the quick rail pressure control mode.

Further, the controller 40 may be a dedicated controller performing the rail pressure control mode but applies an engine electronic control unit (ECU) and then the controller 40 is called the engine ECU.

Further, the common rail engine system 1 is not illustrated, but includes a sensor, an apparatus, etc., which are applied to a general common rail engine system.

Hereinafter, an example of the method for controlling a diesel engine rail pressure at the time of ISG restarting of FIG. 1 will be described in detail with reference to FIGS. 3 to 6. An execution subject of the method for controlling a diesel engine rail pressure at the time of the ISG restarting is an engine ECU 40, and upon embodying the method, it is apparent that the subject is the engine ECU 40 although the engine ECU 40 is not mentioned.

Referring back to FIG. 1, in S1, an engine on means that the engine is operated by a key on or a switch on.

In S10, the engine ECU 40 monitors an operating state of the engine and a monitoring state of an idle stop and idle go operation of ISG logic. Referring specifically to FIG. 2, monitoring data of the engine ECU 40 includes an operation of the MeUn 21 and the PCV 31, cooling water temperature and fuel temperature detected by each sensor, etc. Here, the cooling water temperature and the fuel temperature are used to determine cold start at the time of the restarting of the engine.

In S20, the engine ECU 40 recognizes the stop of the engine by the idle stop of the ISG logic.

In S30, the engine ECU 40 recognizes that the restarting engine after the engine stops by the idle stop depends on the idle go of the ISG logic. On the other hand, in S30, when the engine ECU 40 does not recognize the idle go, the method proceeds to S30-1 and thus it is determined that the engine restarts by IG On.

The engine ECU 40 recognizing the idle go in S30 enters S40 and thus it is again determined whether to control the restarting engine by the cold start. To this end, current cooling water temperature>set cooling water temperature and current fuel temperature>set fuel temperature are applied. Here, ">" is an inequality sign representing a size relationship between two values and means that the current cooling water temperature or the current fuel temperature has a value larger than the set cooling water temperature or the set fuel temperature. As the result, the engine ECU 40 decides whether to control the rail pressure by the normal rail pressure control mode or the quick rail pressure control mode at the time of the engine restarting by the idle go.

In S40, if the engine ECU 40 determines that the current cooling water is larger than the set cooling water temperature and the current fuel temperature is larger than the set fuel temperature, the method proceeds to S50 and thus the rail pressure of the engine is controlled by the quick rail pressure control mode. In this case, the quick rail pressure control mode means the MeUn control to which only the fuel pressure control is applied.

Figure 3:
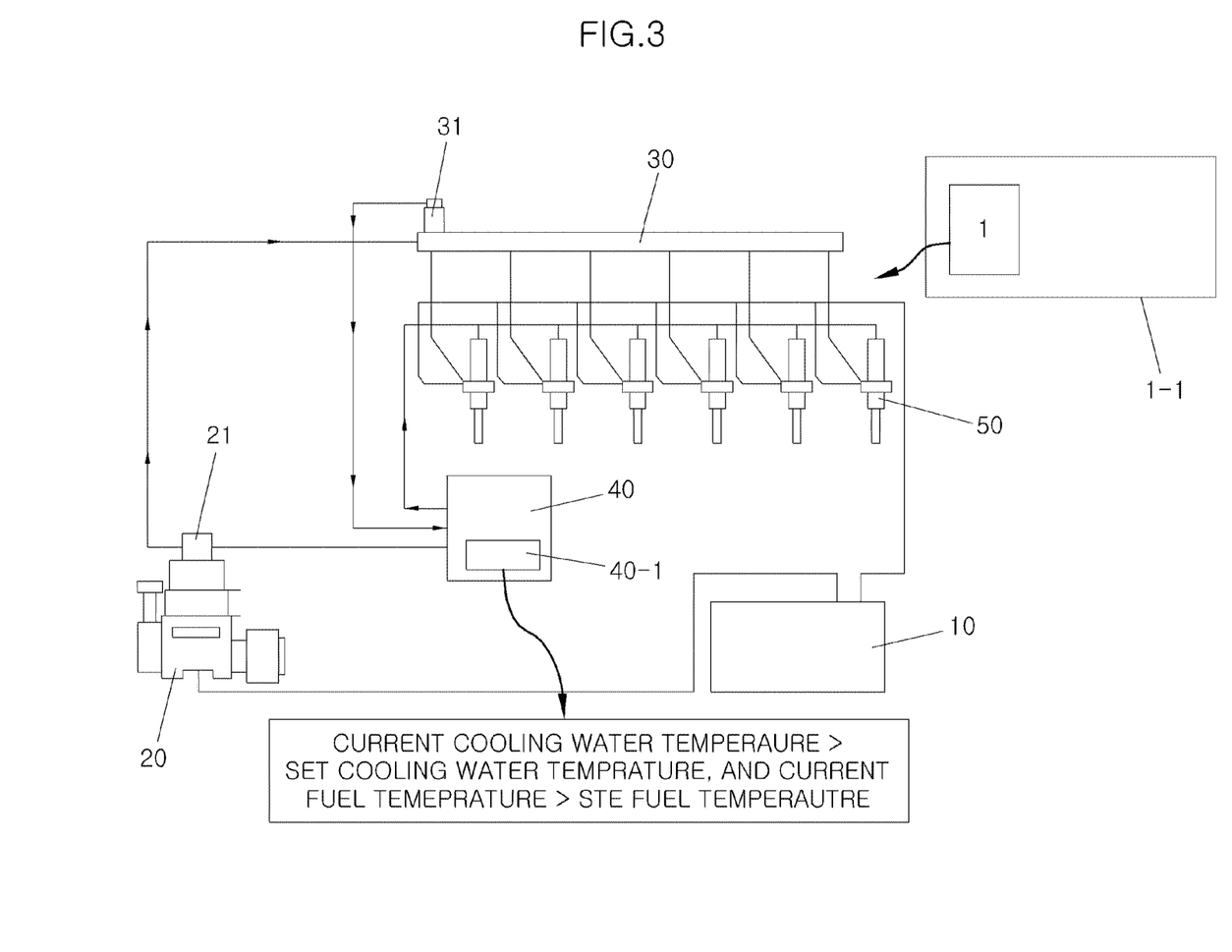
FIG. 3 is a diagram illustrating an example in which a rail pressure control is immediately executed based on an MeUn control mode by the controller of the diesel ISG vehicle according to an exemplary form of the present disclosure.

FIG. 3 illustrates that the common rail engine system 1 performs only the fuel pressure control by performing the quick rail pressure control mode. As illustrated in FIG. 3, a cold start determiner 40-1 reads a current detection value of the cooling water temperature and the current detection value of the fuel temperature from the monitoring data of the engine ECU 40, compares these detection values with the set values, respectively, and then provides the determination result that the current cooling water temperature is larger than the set cooling water temperature and the current fuel temperature is larger than the set fuel temperature to the engine ECU 40. Next, the engine ECU 40 controls an opened degree of the MeUn 21 included in the fuel pump 20 to pump fuel pumped and pressure-controlled in the fuel tank 20 to the common rail 30 and inject the fuel from the injector 50. As the result, the diesel ISG vehicle 1-1 restarts the engine without increasing the driving torque of the high pressure pump under the control of the rail pressure of the common rail engine system 1.

Figure 4:
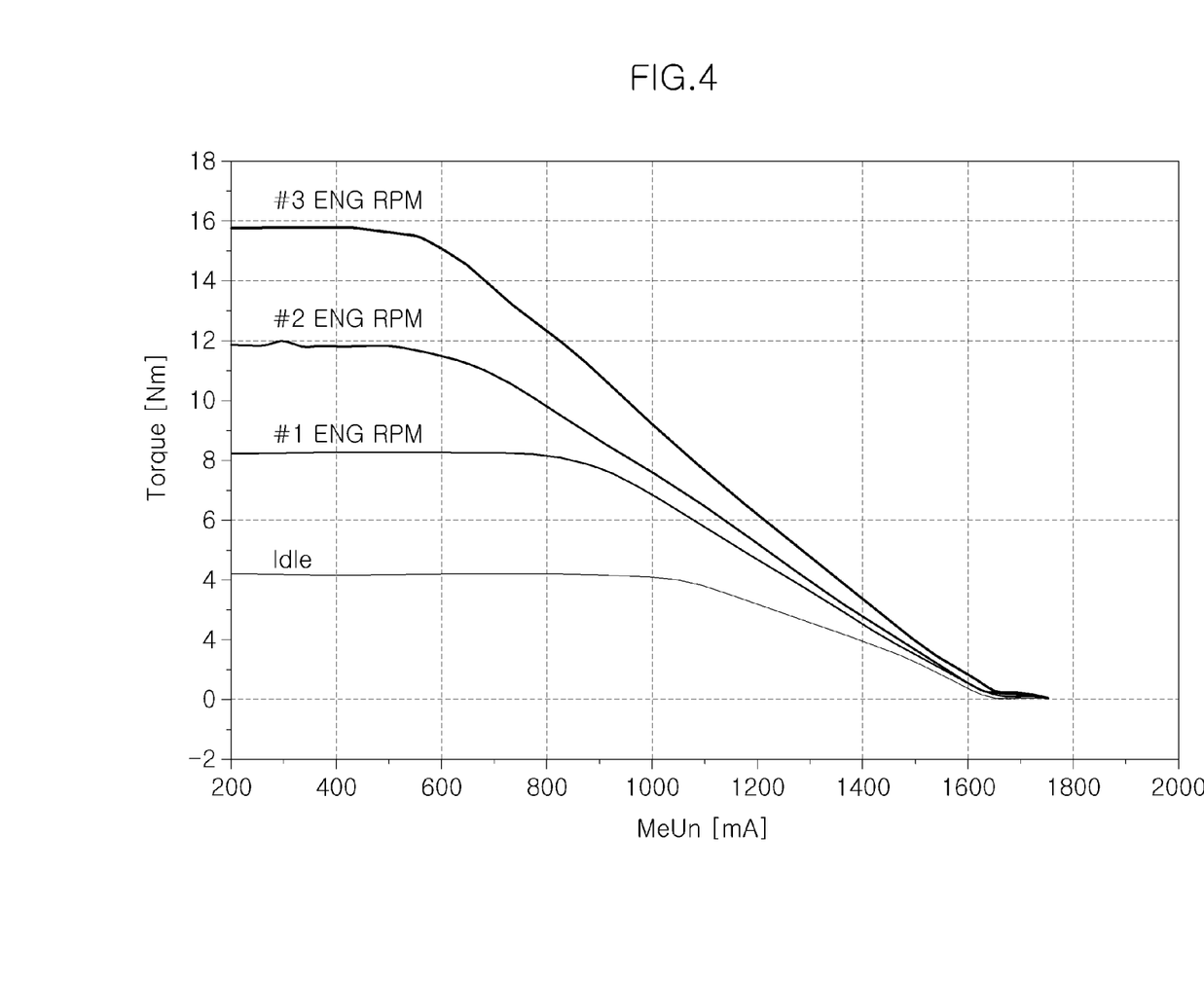
FIG. 4 is a graph illustrating an example of a torque of a high pressure pump to an MeUn output at the time of the MeUn control mode according to an exemplary form of the present disclosure.

FIG. 4 illustrates an example of the torque of the high pressure pump to the MeUn output at the time of the MeUn control. As illustrated in FIG. 4, it is confirmed that the torque of the high pressure pump is not increased due to the increase (change from 200 mA to 1600 mA) in an output (mA) of the MeUn even though the engine is increased to a third section engine RPM (#3 ENG ROM) in the Idle RPM.

Meanwhile, if it is determined in S30-1 that the engine ECU 40 detects the IG On or in S40 that the current cooling water temperature is smaller than the set cooling water temperature and the current fuel temperature is smaller than the set fuel temperature, the PCV control in S60, the CPC control in S70, and the MeUn control in S90 are sequentially performed and thus the engine rail pressure is controlled by the normal rail pressure control mode, thereby performing the fuel pressure control along with the fuel flow rate control by the operation of the high pressure pump.

Figure 5:
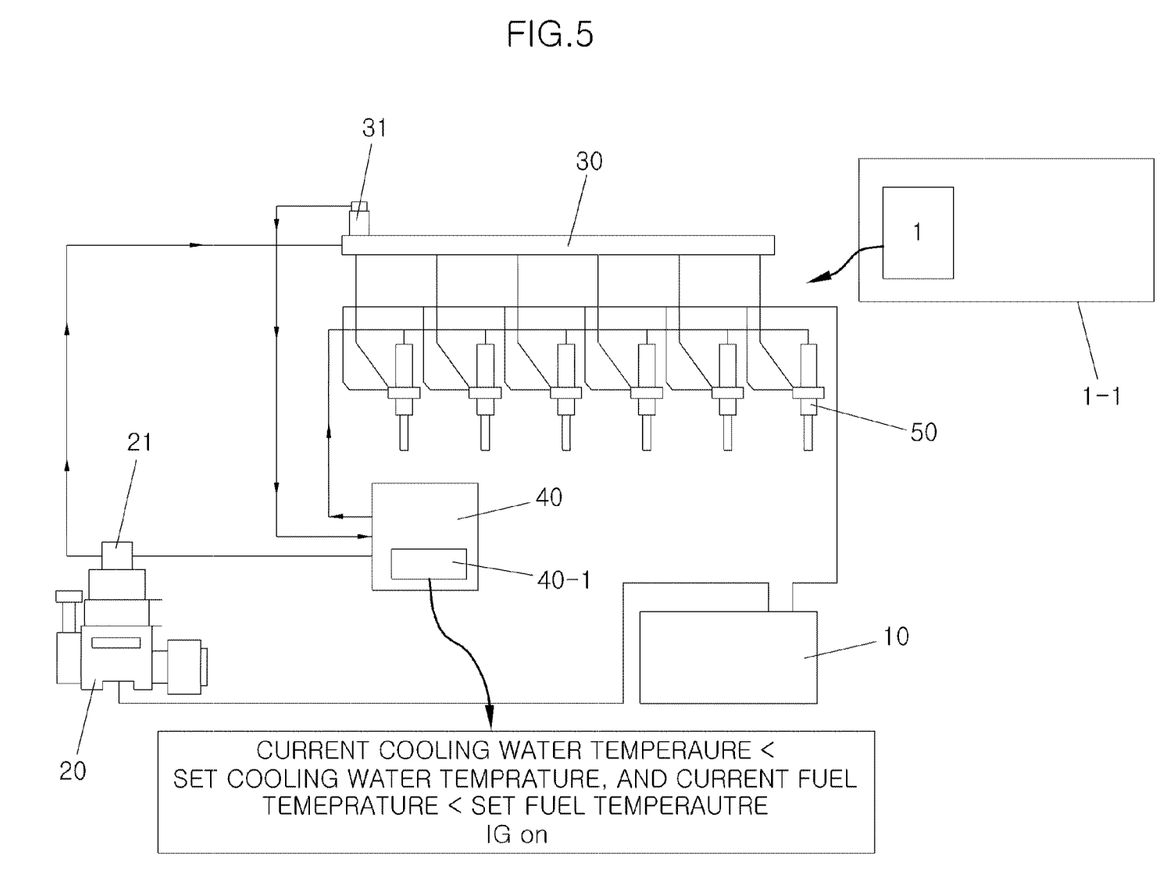
FIG. 5 is a diagram illustrating a an example in which a rail pressure control is executed based on a PCV control mode, a CPC control mode, and an MeUn control mode by the controller of the diesel ISG vehicle according to an exemplary form of the present disclosure.

FIG. 5 illustrates the state in which the common rail engine system 1 performs the fuel pressure control along with the fuel flow rate control by performing the normal rail pressure control mode. As illustrated in FIG. 5, the cold start determiner 40-1 provides the IG On detection to the engine ECU 40 or reads a current detection value of the cooling water temperature and the current detection value of the fuel temperature from the monitoring data of the engine ECU 40, compares these detection values with the set values, respectively, and then provides the determination result that the current cooling water temperature is smaller than the set cooling water temperature and the current fuel temperature is smaller than the set fuel temperature to the engine ECU 40.

Next, the engine ECU 40 continuously performs the PCV control of S60 and the CPC control of S70 and continuously checks an arrival of control time of S80 during the CPC control. In this case, the control time is set to be about 10 to 15 seconds. The PCV control of S60 is performed and thus the high pressure pump is driven to increase the pressure of the fuel and pumps the fuel to the common rail 30 and the injector 50 injects the fuel by the control of the PCV 31. Further, the CPC control is performed in S70 and thus the high pressure pump is driven to increase the pressure of the fuel and pumps fuel of which the pressure is controlled by the opening of the MeUn 21 to the common rail 30 and the injector 50 injects the fuel by the control of the PCV 31. Next, the engine ECU 40 confirms the arrival of the control time by the PCV control and the CPC control and then is converted into the MeUn control of S90. The MeUn control of S90 is performed and thus fuel pumped and pressure-controlled in the fuel tank 10 is pumped to the common rail 30 and the fuel is injected from the injector 50. As the result, the diesel ISG vehicle 1-1 performs the engine restarting which increase the driving torque of the high pressure pump but greatly improves the cold start performance under the control of the rail pressure of the common rail engine system 1.

Figure 6:
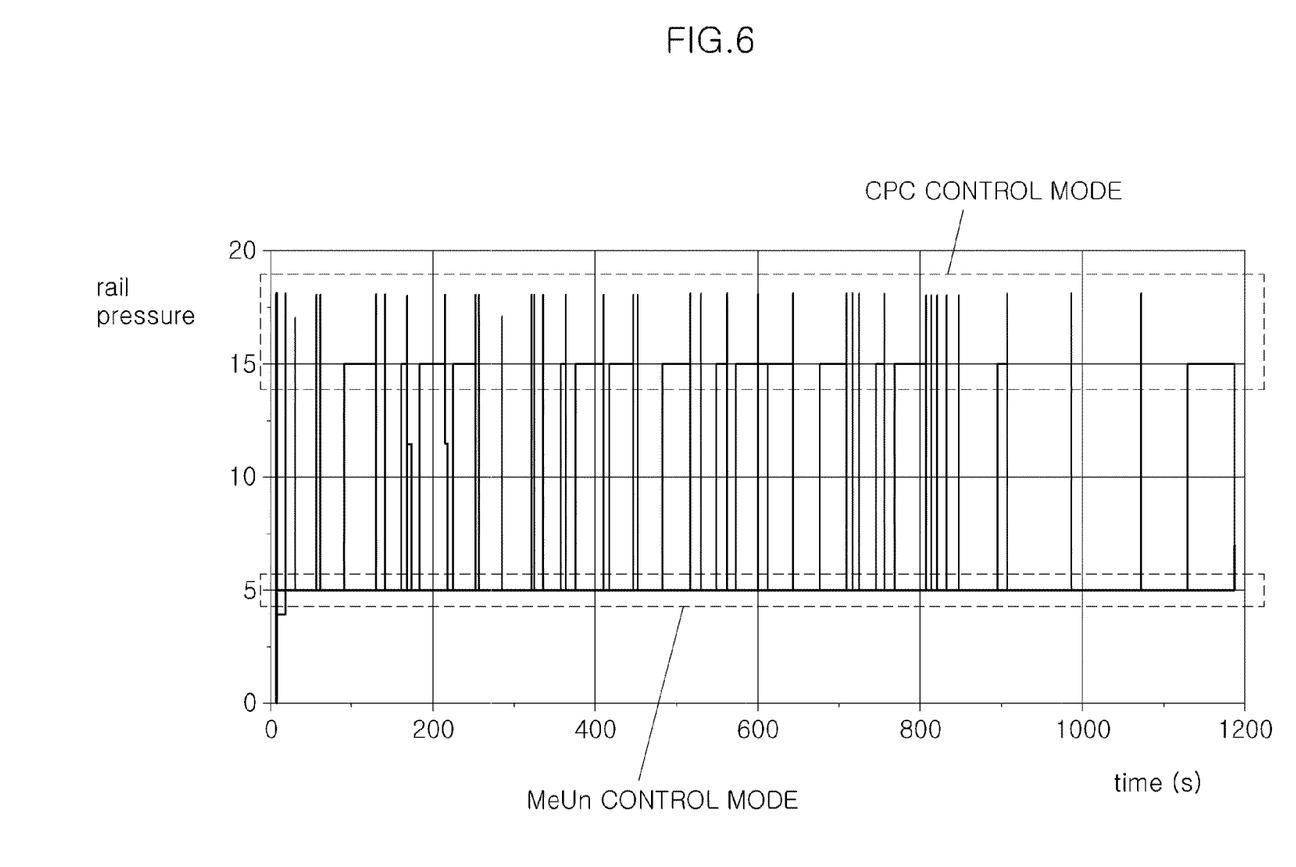
FIG. 6 is a graph illustrating a change in a rail pressure generated at the time of the execution of the CPC control mode according to an exemplary form of the present disclosure.

FIG. 6 is a graph illustrating a change in a rail pressure generated at the time of the execution of the CPC control mode according to an exemplary form of the present disclosure. As illustrated in FIG. 6, it may be appreciated that the CPC control greatly generates a change width in the rail pressure to the MeUn control. Therefore, compared with the rail pressure control mode in which PCV control→CPC control→MeUn control are sequentially controlled at the time of the engine restarting, the quick rail pressure control mode in which only the MeUn control is performed does not involve the increase in the driving torque of the high pressure pump, such that the loss of the accessories is reduced to reduce the fuel injection quantity and the execution reduction of the PCV/CPC control unfavorable for fuel efficiency even at the time of the frequent engine restarting by the ISG Go may be reduced to improve the fuel efficiency.

As described above, the diesel ISG vehicle according to an exemplary form of the present disclosure includes the engine ECU 40 controlling the rail pressure of the common rail engine system 1 and the engine ECU 40 determines the cold start of the engine based on the detected cooling water temperature and the detected fuel temperature at the time of the engine restarting by the idle go of the idle stop & go (ISG) and then restarts the engine by the quick rail pressure control mode in which the pressure of the fuel pumped to the common rail 30 is controlled or restarts the engine by the normal rail pressure control mode in which the flow rate and the pressure of the fuel is controlled, thereby improving the fuel efficiency by the ISG restarting which does not increase the driving torque of the high pressure pump, in particular, reducing the fuel injection quantity by the reduction in the loss of the accessories.

According to the exemplary forms of the present disclosure, it is possible to distinguish the operation for the rail pressure control mode to increase the driving torque of the high pressure pump from the operation for the rail pressure control mode not to increase the driving torque of the high pressure pump and reduce the execution frequency and the execution time of the rail pressure control mode increasing the driving torque of the high pressure pump, by performing the ISG restarting distinguished depending on the cold start of the engine.

Further, according to the exemplary forms of the present disclosure, it is possible to improve fuel efficiency by reducing the execution frequency and the execution time of the rail pressure control mode increasing the driving torque of the high pressure pump to reduce the execution of the PCV/CPC control mode which is unfavorable for fuel efficiency even when the engine restarting is frequently performed by the ISG.

Further, according to the exemplary forms of the present disclosure, it is possible to reduce the loss of the accessories such as the pump and the compressor by inhibiting the driving torque of the high pressure pump from increasing at the time of the ISG restarting performed under the non-cold start conditions of the engine and reduce the fuel injection quantity by reducing the loss of the accessories.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method of controlling a diesel engine rail pressure at the time of ISG (Idle Stop and Go) restarting, comprising:
   (A) an idle stop & go (ISG) operation confirming step of confirming, by a controller, whether a restarting signal is an idle go or an ignition switch on when recognizing a stop of an engine by an idle stop of ISG and then detecting a restarting signal of the engine;
   (B) a rail pressure control selecting step of determining, by the controller, an excess of a cold starting condition of the engine based on engine monitoring data of the engine if it is confirmed that the restarting signal is the idle go; and
   (C) a quick rail pressure control step of selecting, by the controller, an MeUn (Metering Unit Valve) control at the time of the idle go condition and the excess of the cold starting condition and performing, by an MeUn control, the restarting based on a pressure control of fuel pumped to a common rail.

2. The method of claim 1, wherein the engine monitoring data include detected cooling water temperature and detected fuel temperature, the detected cooling water temperature and the detected fuel temperature are each defined as current cooling water temperature and current fuel temperature when the cold starting condition is determined, and the current cooling water temperature and the current fuel temperature are each compared with set cooling water temperature and set fuel temperature to determine the excess of the cold starting condition.

3. The method of claim 2, wherein the excess of the cold starting condition is when the current cooling water temperature is larger than the set cooling water temperature and the current fuel temperature is larger than the set fuel temperature.

4. The method of claim 1, wherein the MeUn control is performed by a control of a metering unit valve included in a fuel pump.

5. The method of claim 1, further comprising: (D) a normal rail pressure control step of selecting, by the controller, each of a PCV (Pressure Control Valve) control, a CPC (Coupled Pressure Control) control, and the MeUn control when the idle go or ignition switch is on or the cold start condition arrives, wherein the PCV control performs the restarting based on a control of a flow rate of fuel pumped to the common rail, the CPC control performs the restarting based on a flow rate and a pressure control of fuel pumped to the common rail, and the MeUn control performs the restarting based the pressure control of the fuel pumped to the common rail.

6. The method of claim 5, wherein the controller performs the MeUn control after the PCV control and the CPC control are performed at a predetermined frequency for a predetermined time.

7. The method of claim 6, wherein the predetermined time ranges from 10 to 15 seconds.

8. The method of claim 5, wherein the PCV control is implemented as a pressure control value included in the common rail.

9. The method of claim 1, wherein the controller is an engine electronic control unit (ECU).

10. A diesel ISG vehicle, comprising:
   an engine electronic control unit (ECU) configured to compare cooling water temperature and fuel temperature with set values to determine a cold start of an engine, recognize idle stop and idle go signals of idle stop and go, detect an ignition switch on/off, perform the engine restarting based on a pressure control of fuel pumped to a common rail at the time of the idle go and an excess of the cold start condition, and perform the engine restarting based on a flow rate control and a pressure control of fuel pumped to the common rail at the time of an arrival of the ignition switch on or the cold start condition; and
   a common rail engine system configured to include a plurality of injectors included in a common rail to inject fuel, a metering unit valve included in a fuel pump to perform a pressure control of the fuel by a control of the engine ECU, and a pressure control valve included in the common rail to perform a flow rate control of the fuel by the control of the engine ECU.

11. The diesel ISG vehicle of claim 10, wherein the engine ECU includes a cold start determiner and the cold start determiner compares cooling water temperature and fuel temperature with set values to determine cold start of the engine.

* * * * *